Patented Sept. 22, 1953

2,653,142

UNITED STATES PATENT OFFICE 2,653,142

ESTER RESINS FOR VARNISHES AND INKS USING MONOMERIC PHENOLIC ETHERS OF ALIPHATIC POLYHYDROXY ALCOHOLS

William P. Cody, Lombard, and Edgar L. Clark, Cicero, Ill., assignors to Alkydol Laboratories, Inc., Cicero, Ill., a corporation of Illinois No Drawing. Application May 16, 1951,
Serial No. 226,748

13 Claims. (Cl. 260—26)

This invention relates to new synthetic resins of the ester type, which are suitable for oleoresinous varnish and printing ink formulations.

These resins are esters of rosin or other natural resins of high acidity, their adducts, or mixtures of these, with dibasic aliphatic or aromatic carboxylic acids in which the alcoholic residue is a monomeric monohydric phenolic ether of aliphatic polyhydric alcohols and their epoxides. More specifically the alcohols which are esterified are the glycidyl ethers, the glycerol ethers and the glycol ethers of monohydric phenols. In place of crude or refined rosins other natural resins of high acidity can be utilized, such as copals, abietic acid from tall oil and "Vinsol"[1]. Whereas there has been recited above that mixtures of these with polybasic organic carboxylic acids may be used it will be understood that the anhydrides of the latter are likewise suitable in the synthesis. Instead of one natural resin, mixtures of several can be employed likewise.

The acid value of rosin is approximately 165–171, that of Congo copals approximately 92–110, that of tall oil approximately 175 and that of "Vinsol" resin approximately 93. By the term "natural resins of high acidity" or "natural resin acids of high acidity" which is used in various portions of the description is means the naturally occurring resins, of at least 75 acid value, including those obtained by distillation or extraction processes as with rosin or as a by-product of the sulfite process in the case of tall oil.

The preparation of varnish resins, especially of the oil-soluble types, has been practiced for many years. Ester gums have been prepared from rosin esterified with glycols, glycerols, sorbitol, pentaerythritols and other polyhydric alcohols or their mixtures. To produce harder and chemically higher resistant resins, these ester gums have been modified with aliphatic dibasic acids or their anhydrides, such as fumeric acid and maleic anhydride. Ester gums have also been modified with phenol-formaldehyde condensation products of various characteristics, and combinations of the acid and phenol modified ester gums have also been brought on the market to satisfy the requirements of the paint, varnish and printing industries. None of these resins, however, give the desired results, and all have certain shortcomings, which make it rather difficult for the ink and varnish maker to select the proper resin. Resins which have fast drying properties and high chemical resistance lack solubility in common solvents and in drying oils customarily used by the ink and varnish manufacturers. These properties force the varnish maker to resort to extremely high temperatures to prepare his products. Some of these resins having very valuable properties otherwise, cannot be used because they show excessive foaming in the varnish kettle and, therefore, are not desirable from a safety and economic standpoint.

The preparation itself of these high melting point and chemically resistant varnish resins employing rosin and dibasic carboxylic acids or their anhydrides is also difficult from a manufacturing standpoint. The resins develop excess viscosity and foaming in the reactor, making uniform production a difficult procedure. These difficulties are substantially overcome in our invention, wherein the esterification is with the monomeric monohydric phenolic ethers of polyhydric alcohols and their epoxides.

The synthetic ester resins of the present invention are made by reacting rosin or other natural resin acids, their adducts, or mixtures thereof with aliphatic or aromatic dibasic carboxylic acids or their anhydrides, with monomeric monohydric phenolic ethers of polyhydric alcohols or their epoxides until esterification substantially is completed. The preferred polyhydric alcohols of this general characterization are glycerol phenol ethers and glycol phenol ethers, and the preferred aliphatic epoxides are glycidyl phenol ethers. Applicants do not employ polymeric structure of

—(—O—R—O—R₁)ₙ— in which R is the residue of a dihydric phenol and R₁ is the residue of difunctional alcohol containing a reactant such as epichlorohydrin, a polychlorohydrin, or a polyepoxide compound. They employ a glycerol ether or glycol ether or glycidyl ether of a monomeric mono-hydric phenol. The phenyl group may be substituted one or more times by an aliphatic or aromatic hydrocarbon radical and in different positions in reference to the phenolic hydroxyl group. The simple phenol ether itself may be used. Such types of monomeric ethers of phenol, xylenols, ortho-cresol, para-tertiary butyl phenol, octyl and nonyl phenols are thin to viscous liquids, having a water white to amber color. They possess high boiling points, that is, above 250° C.

[1] "Vinsol" is a trade-mark of the Hercules Powder Co. of Wilmington, Delaware, for a non-tacky thermoplastic, gasoline-insoluble, aromatic hydrocarbon-soluble resinous extract of pine wood, more particularly the stump. It is saponifiable and esterifiable with polyhydric alcohols. Typical analysis values for it are: Density (at 25° C.) 1.21, acid #93 and saponification #135.

at 760 mm. pressure. These products differ entirely from the solid-like resinous polymeric polyhydric alcohol condensation products containing epoxide and hydroxyl groups formed by reacting a polyhydric phenol with either chlorohydrin or polyepoxide compounds.

In the synthesis of our ester resins suitable for the preparation of oleoresinous varnishes and printing inks, one of these above-mentioned monomeric phenyl ethers of a monohydric phenol is heated with rosin or other natural resin acids of high acidity or mixtures of these, or mixtures of rosin or other resin acids of high acidity with organic dicarboxylic acids or their anhydrides, until the esterification is substantially complete. The esterification is carried out in the customary reaction vessel, and a temperature of 500–550° F. applied. The reaction can be carried out under vacuum or ordinary atmospheric pressure with continuous agitation, as it is known in the art.

In the preparation of our preferred reactant, a monomeric glycidyl phenyl ether, epichlorohydrin is caused to react with a monohydric phenolic compound, such as cresol or xylenol, under strong alkaline conditions to produce a glycidyl ether of a monohydric phenolic compound. Using a 1:1 molar ratio of a monohydric phenol to epichlorohydrin, the reaction is believed to proceed as follows:

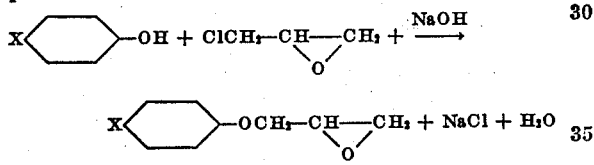

where X is an aliphatic or aromatic hydrocarbon group present in either the ortho, meta or para position with respect to the phenol group. This reaction is referred to in U. S. Patent #2,221,771 and J. Chem. Soc., 1932, 1965–72.

When a monomeric glycerol phenyl ether is employed as the esterifying agent, glycerine monochlorohydrin is caused to react with an equimolar quantity of monohydric phenolic compound, with the quantity of sodium hydroxide being slightly greater than molar. The reaction is believed to proceed as follows:

CH₂ClCHOHCH₂OH+ROH+NaOH→
ROCH₂CHOHCH₂OH+NaCl+H₂O where R represents a phenyl group.

If it is desired to employ a reactant which contains both an aliphatic alcohol group and an epoxide group, butylene dioxide can be employed in the condensation with the monohydric phenol. This latter condensation product would have the formula:

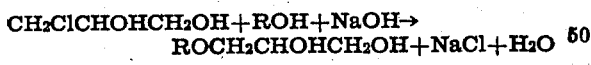

When the reactant is a glycol phenyl ether, ethylene chlorohydrin is caused to react with an equimolar quantity of a monohydric phenolic compouid, with the quantity of sodium hydroxide being slightly greater than molar. The reaction is believed to proceed as follows:

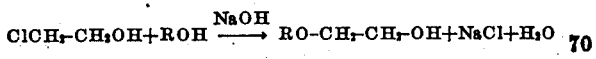

where R represents a phenyl group.

Rosins of various types and grades, whether refined or not, are the main acidic constituents which we employ in the preparation of our synthetic resins by esterification. In this we also include abietic acid, which is one of the constituents of rosins, and may be derived not only from rosin, but also from other sources.

As pointed out supra there may be employed an organic dicarboxylic acid or its anhydride in addition to rosin as esterifying agent. As to the dibasic acids there may be used any of those conventionally used in making resins, such as maleic acid, fumaric acid, phthalic acid, succinic acid, adipic acid, sebacic acid, etc. and/or their anhydrides.

The proportions of rosins or other natural resin aids of high acidity and polybasic organic acids used with the monomeric monohydric phenolic ethers of an aliphatic polyhydric alcohol or the epoxides can be varied; and mixtures of natural resin of high acidity and different polybasic organic acids and of the said phenolic ethers can also be employed.

The preparation of the condensation products respectively: glycidyl phenyl ether, glycerol phenyl ether, glycol phenyl ether, and the ester resin of each with rosin are illustrated by the following examples. It should be understood, however, that the synthesis of these ethers forms no part of the present invention. The examples serve to illustrate the invention but in no sense is the invention limited thereto.

EXAMPLE 1

A. *Preparation of ortho-cresol glycidyl ether*

216 grams of 30° ortho-cresol was dissolved in 770 grams of a 15% aqueous solution of sodium hydroxide. The solution was maintained at 35° C. and 186 grams of epichlorohydrin

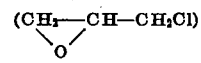

was added. The mixture was held at 35° C. for 4 hours and then heated to 80° C. and held for 1 hour. An amber liquid insoluble in the alkaline medium separated. This liquid was separated and washed with 2% aqueous HCl solution until a pH of 6–7 of the wash water was obtained. The water-insoluble liquid was next heated at 100° C. under 15 inches of vacuum until anhydrous. It was filtered through a Buchner funnel to remove any NaCl crystals left from neutralization step. The yield was 300 grams. This liquid is ortho-cresol glycidyl ether, the constants of which are:

Color_____ 7–8, Gardner scale, 1933
Viscosity_____ 0.5 poise at 77° F. (25° C.)
Density_____ 1.09 at 77° F. (25° C.)
Equivalent weight___ 82

B. *Preparation of a rosin ester of ortho-cresol glycidyl ether*

250 parts of this cresol epoxide ether was added to 750 grams of a WW grade of gum rosin. The mixture was heated to 250° C. and held at this temperature for 4 hours. During this time esterification of the rosin acids with the phenol epoxide which functions as a dihydric alcohol was evidenced by a drop in the acid number from 115 to 9.50. The resulting solid ester had the following constants:

Melting point____ 70° C. (158° F.), Ball and Ring method
Acid number____ 9.50
Color_____ WW, U. S. D. A. Rosin scale
Solubility_____ Soluble in aliphatic and aromatic hydrocarbons
Density_____ 1.05 at 77° F. (25° C.)

C. Varnish prepared with this rosin ester

Equal parts of the synthetic rosin ester described above and tung oil were heated together to 250° C. and held at this temperature for one hour. This varnish was then cooled to 200° C. and diluted with mineral spirits to produce a solution of 50% solids. The constants on this varnish are as follows:

| | |
|---|---|
| Viscosity | E-F, Gardner Holdt scale, at 77° F. (25° C.) |
| Color | 9–10, Gardner scale, 1933 |
| Acid number | 9.0 on solids |
| Weight per gallon | 7.50 pounds at 77° F. (25° C.) |

When proper amounts of cobalt and lead naphthenates were added as driers, this varnish air dried to a tough, flexible, glossy film in 4 hours. After 48 hours, air dried films were tested for chemical resistance with the following results:

| | |
|---|---|
| Immersion in 3% NaOH aqueous solution. | Not damaged in 24 hrs. |
| Immersion in cold water. | Not damaged in 72 hrs. |
| Immersion in boiling water. | Not damaged in 1 hr. |
| Gasoline immersion | Not damaged in 24 hrs. |

EXAMPLE 2

A. Preparation of para-tertiary butyl phenol glycidyl ether 150 grams of para-tertiary butyl phenol was dissolved in 335 grams of 15% aqueous NaOH solution. 93 grams of epichlorohydrin was added and the temperature of the mixture was maintained at 35° C. for 4 hours. The solution was then heated to 80° C. and held for 1 hour. The clear, water-insoluble liquid which formed was separated and washed with 2% aqueous HCl solution until a pH of 6–7 of the wash water was reached. The phenolic liquid was finally heated under 15 inches of vacuum until anhydrous, and filtered through a Buchner funnel to remove NaCl left from a preceding neutralization step. The yield of dehydrated condensation product was 198 grams. The constants on the glycidyl ether of para-tertiary butyl phenol were:

| | |
|---|---|
| Color | 8–9, Gardner scale, 1933 |
| Viscosity | 4.35 poises at 77° F. (25° C.) |
| Density | 1.10 at 77° F. (25° C.) |
| Equivalent weight | 102 |

B. Preparation of mixed rosin and maleic acid esters 420 grams of WW gum rosin, 70 grams of maleic anhydride and 140 grams of the para-tertiary butyl phenol-epoxide prepared above, were heated to 210° C. 70 grams of pentaerythritol was added and the temperature of the mixture was increased to 260° C. This temperature was held for 6 hours, at the end of which time the resin was poured in a pan and cooled. The resin constants were:

| | |
|---|---|
| Melting point | 142° C., Ball and Ring method |
| Acid number | 20 |
| Color | WG, U. S. D. A. Rosin scale |
| Solubility | Soluble in aromatic hydrocarbons |
| Density | 1.10 at 77° F. (25° C.) |

C. Varnish prepared with this mixed rosin maleic acid ester 200 grams of this para-tertiary butyl phenol glycidyl ether rosin ester and 100 grams of a G-H viscosity dehydrated castor oil were heated together to 250° C. 100 grams of $Z_3$ viscosity dehydrated castor oil were then added and the temperature was raised to 280° C. and held for 20 minutes. The varnish was cooled and reduced to 50% solids in mineral spirits. The constants on the varnish were:

| | |
|---|---|
| Viscosity | H-I, Gardner Holdt scale, at 77° F. (25° C.) |
| Color | 9, Gardner scale, 1933 |
| Acid number | 16.8 on solids |
| Weight per gallon | 7.50 pounds at 77° F. (25° C.) |

After the addition of the proper amounts of cobalt and lead naphthenate driers, this varnish dried to a tough, glossy, adherent film in 4 hours. After 48 hours air dry varnish films were tested for chemical resistance with the following results:

| | |
|---|---|
| Immersion in 3% NaOH aqueous solution. | Not affected 24 hours |
| Immersion in cold water | Not affected 72 hours |
| Immersion in gasoline | Not affected 72 hours |

EXAMPLE 3

A. Preparation of glycidyl ether of para-octyl phenol 206 grams of para-octyl phenol was dissolved in 335 grams of 15% aqueous NaOH solution. 93 grams of epichlorohydrin was added and the temperature was maintained at 35° C. for 4 hours. The mixture was then heated to 80° C. and held there for 1 hour. An amber colored, viscous liquid which was insoluble in the alkaline medium was formed. After cooling the resinous material was separated and washed with 2% aqueous HCl until the washings had a pH of 6–7. After being heated under 15 inches of vacuum until anhydrous, the hot syrup was filtered through a Buchner funnel to remove NaCl formed during the process. The yield was 250 grams. Constants of the liquid condensate, identified in A supra were:

| | |
|---|---|
| Color | 5–6, Gardner scale, 1933 |
| Viscosity | 10.70 poises at 77° F. (25° C.) |
| Density | 1.15 at 77° F. (25° C.) |
| Equivalent weight | 135 |

B. Congo copal resin of para-octyl phenyl glycidyl ether

To 800 grams of a pure thermally processed Congo copal was added 200 parts of the above described epoxide syrup. The mixture was heated to 260° C. and held with agitation at this temperature for 6 hours. During this period the acid number dropped from 70 to 11.5. The resin was poured into a pan and allowed to cool to room temperature. The recorded constants of the resin were:

| | |
|---|---|
| Melting point | 120° C., Ball and Ring method |
| Acid number | 11.5 |
| Color | F-G, U. S. D. A. Rosin scale |
| Density | 1.05 at 77° F. (25° C.) |
| Solubility | Soluble in aliphatic hydrocarbons |

C. Varnish prepared with this Congo copal ester 400 parts of the above described Congo copal ester were heated with 600 parts of a Z viscosity kettle-bodied linseed oil to a temperature of 305° C. This temperature was maintained for 1 hour. The varnish was then removed from the fire and cooled to 200° C. and reduced to 50% solids with mineral spirits. Recorded constants on the varnish were:

Weight per gallon _ 7.47 pounds at 77° F. (25° C.)
Viscosity _____ H–I, Gardner-Holdt scale, at 77° F. (25° C.)
Color _____ 14–15, Gardner scale, 1933
Acid number _____ 13.5 on solids After the proper amounts of cobalt and lead naphthenate driers were added, films of this varnish air dried to a tough, flexible, glossy finish in 6 hours.

After 48 hours air dry, varnish films were tested for chemical resistance with the following results:

Immersion in 3% NaOH
  aqueous solution _____ Not affected 30 hours
Immersion in cold water _ Not affected 72 hours
Immersion in gasoline ___ Not affected 24 hours

EXAMPLE 4

A. *Preparation of glycidyl ether of para-nonyl phenol*

200 grams of para-nonyl phenol was dissolved in 335 grams of a 15% aqueous NaOH solution. 93 grams of epichlorohydrin was added and the mixture was maintained at 35° C. for 4 hours. It was then heated to 80° C. and held 1 hour. A pale viscous, water-insoluble liquid formed. The syrup was separated, then washed to a pH of 6–7 with 2% aqueous HCl. After being heated at 95° C. under vacuum until anhydrous, it was filtered while hot to remove NaCl formed during the reaction and neutralization process. The yield was 266 grams. Constants on the liquid condensate identified in A were:

Color _____ 3–4, Gardner scale, 1933
Viscosity _____ 12.90 poises at 77° F. (25° C.)
Density _____ 1.15 at 77° F. (25° C.)
Equivalent weight _ 140

B. *Rosin ester of the glycidyl ether of para-nonyl phenol*

180 grams of the above phenolic epoxide syrup were heated with 740 grams of WW Polypale Rosin (Hercules Powder Company) and 80 grams of "Polypentek"[1] at 260° C. for 6 hours. The acid value decreased during heating from 110 to 13. The resin was poured into a pan and when cool was a brittle solid with the following constants:

Melting point ___ 120° C., Ball and Ring method
Acid number ____ 13
Color _____ WG, U. S. D. A. Rosin scale
Density _____ 1.07
Solubility _____ Soluble in aromatic and aliphatic hydrocarbons C. *Varnish prepared with rosin ester of the glycidyl ether of para-nonyl phenol*

600 parts of the rosin-octyl phenol ester from B of this example were dissolved in 400 parts of a mineral solvent having a B. P. of 245° C. This solution has the following constants:

Solids _____ 60% by weight
Weight per gallon _ 8.10 pounds at 77° F. (25° C.)
Viscosity _____ Z–Z₁, Gardner-Holdt scale, at 77° F. (25° C.)
Color _____ 9–10, Gardner scale, 1933
Acid number _____ 12 on solids

[1] "Polypentek" is a trade-mark name for polypentaerythritol of Heyden Chemical Company of New York, New York.

This varnish, after being properly pigmented and printed at high speeds, and dried between banks of gas burners or over heated cylinders to drive off the solvent, is of excellent solvent release and develops a high gloss, smudge resistant print.

EXAMPLE 5

A. *Preparation of glycidyl ether of para-octyl phenol*

206 grams of para-octyl phenol were dissolved in 335 grams of 15% aqueous NaOH solution. 93 grams of epichlorohydrin were added and the temperature of the mixture was maintained at 35° C. and held for 4 hours, and then raised to 80° C. and held for 1 hour. A clear viscous water-insoluble liquid was formed. It was separated from the aqueous medium and was then acidified to a pH of 3–4 with 2% aqueous HCl. To this mixture of phenolic condensate, acid and water there was then added 215 grams of 37% formaldehyde solution. With rapid agitation the mixture was refluxed at 95–100° C. for two hours. A heavy tacky water-insoluble resin had then formed. This was washed twice with hot water. Heating the washed resin at 95° C. under 15 inches of vacuum it was dehydrated to a pale, tacky extremely viscous resin. The yield was 280 grams. Constants of the resinous material were:

Color _____ 7–8, Gardner scale, 1933
Viscosity _____ 550 poises, at 77° F. (25° C.)
Density _____ 1.15 at 77° F. (25° C.)
Equivalent weight _ 135

B. *Rosin ester of epoxy para-octyl phenol ether*

250 grams of the above viscous condensate were heated to 260° C. with 250 grams of a WW grade of wood rosin. After 4 hours heating the acid value had dropped from 80 to 3.50. Heating was discontinued, and the resin was poured in a cooling pan. Its constants were:

Melting point ____ 145° C., Ball and Ring method
Acid number ____ 3.5
Color _____ WG–N, U. S. D. A. Resin scale
Density _____ 1.10 at 77° F. (25° C.)
Solubility _____ Soluble in aromatic and aliphatic hydrocarbons C. *Preparation of a varnish with rosin ester of epoxy para-octyl phenol ether*

100 grams of the above rosin phenolic condensate were heated with 200 parts of tung oil at 235° C. until the mixture showed signs of gelation as evidenced by a gel string from a stirring rod. 300 grams of mineral spirits were immediately added to produce a 50% solution. This spar-type varnish had the following constants:

Weight per gallon _ 7.45 pounds at 77° F. (25° C.)
Viscosity _____ G–H Gardner-Holdt scale at 77° F. (25° C.)
Color _____ 8–9, Gardner scale, 1933
Acid number _____ 5.6 on solids When suitable driers were added (cobalt and lead naphthenate), films of the varnish air dried to tough, glossy, flexible coatings in 2 hours. Resistance tests on films air-dried after 48 hours revealed:

Immersion in 3% aqueous NaOH solution. ____ Not affected in 72 hours
Immersion in 5% aqueous "Ivory" soap solution. ____ Not affected in 72 hours
Immersion in cold water _____ Not affected in 72 hours Immersion in boiling water — Not affected in 72 hours

D. Preparation of lithographic ink vehicle 100 parts of the rosin phenolic condensate described in part B of this example is heated with 120 parts of a linseed oil of #00 litho viscosity to a temperature of 200° C. and held until the resin is dissolved and a uniform solution obtained.

This varnish has the following characteristics:

Solids _____ 100% by weight
Weight per gallon ___ 8.30 pounds at 77° F. (25° C.)
Viscosity _____ Z₃, Gardner-Holdt scale, at 77° F. (25° C.)
Color _____ 10, Gardner scale, 1933
Acid number _____ 4.2

When suitable amounts of cobalt and lead linoleate driers are added, films of this varnish printed on paper set instantaneously, so that printed sheet can be stacked without offsetting and smudging. Because of its quick set, this ink varnish develops high gloss and a minimum of penetration into the paper. After twelve hours, during which further hardening of the film takes place, the printed film is resistant to moisture and can be washed with water and soap solutions.

EXAMPLE 6

A. Preparation of glycidyl ether of ortho para xylenol 120 grams of ortho-para xylenol is dissolved in 315 grams of 15% aqueous NaOH solution. 93 grams of epichlorohydrin is added and the temperature of the mixture is maintained at 35° C. for 4 hours. The solution is then heated to 80° C. and held for 1 hour. The water insoluble liquid formed is separated and washed with 2% aqueous HCl solution until a pH of 6-7 is obtained. The phenolic resinous liquid is finally heated at 50° C. under 15 inches of vacuum until anhydrous, and filtered through a Buchner funnel to remove NaCl left from preceding neutralization step. The yield is 174 grams. The constants on this ortho, para xylenol glycidyl ether are:

Color _____ 7-8, Gardner scale, 1933
Viscosity _____ 0.8 poise at 77° F. (25° C.)
Density _____ 1.09, at 77° F. (25° C.)
Equivalent weight ___ 87

B. Preparation in situ of rosin, fatty acid ester of this epoxide. C. Varnish To 640 grams of a 40% rosin content refined tall oil is added 180 parts of above xylenol glycidyl ether and 180 parts of tung oil. The mixture is heated to 250° C. and held for 4 hours, during which time the acid value of the mixture drops from 89 to 9.50. This resulting ester is cooled to 200° C. and dissolved in 950 grams of mineral spirits. The varnish produced is of approximately 15 gallons oil length. It has the following constants:

Weight per gallon _ 7.45 pounds at 77° F. (25° C.)
Solids _____ 50-1%
Viscosity _____ G-H, Gardner-Holdt scale, at 77° F. (25° C.)
Color _____ 12, Gardner scale, 1933
Acid number _____ 9.50 on solids After the proper amounts of cobalt and lead naphthenate driers were added, films of this varnish air-dried to a tough, flexible, glossy finish in 7 hours.

After 48 hours air dry, varnish films were tested for chemical resistance with the following results:

Immersion in 3% aqueous NaOH solution. — Not affected 24 hours
Immersion in cold water — Not affected 72 hours
Immersion in gasoline — Not affected 24 hours The preparation of the new synthetic esters have been illustrated by same examples but it will be understood that various changes may be made by those skilled in the art. Therefore it will be understood that the invention is not limited thereto but only by the terms of the appended claims.

In these the designation "natural resins" embraces their adducts or mixtures.

We claim as our invention:

1. Ester resins suitable for oleoresinous varnish and printing ink formulations which are esters of rosin with a glycidyl ether of a cresol.

2. Ester resins suitable for oleoresinous varnish and printing ink formulations which are mixed esters of rosin and maleic acid with a glycidyl ether of a butyl phenol.

3. Ester resins suitable for oleoresinous varnish and printing ink formulations which are esters of rosin with a glycidyl ether of a nonyl phenol.

4. Ester resins suitable for oleoresinous varnish and printing ink formulations which are esters of rosin with a glycidyl ether of an octyl phenol.

5. The process of producing ester resins which are suitable for oleoresinous varnishes and printing ink formulations, comprising the steps of heating a natural resin of at least 75 acid value with a member of the group consisting of the monomeric monohydric phenolic ether of aliphatic polyhydric alcohols and their epoxides, which said members are thin to viscous liquids and possess boiling points above 250° C. at 760 mm. pressure, until the esterification is substantially complete.

6. The process of producing ester resins which are suitable for oleoresinous varnishes and printing ink formulations, comprising the steps of heating a member of the group consisting of a di-basic aliphatic carboxylic and aromatic carboxylic acid, and a natural resin of at least 75 acid value with a member of the group consisting of the monomeric monohydric phenolic ethers of aliphatic polyhydric alcohols and their epoxides, which said members are thin to viscous liquids and possess boiling points above 250° C. at 760 mm. pressure, until the esterification is substantially complete.

7. The steps of producing ester resins which are suitable for oleoresinous varnishes and printing ink formulations, comprising the steps of heating a natural resin of at least 75 acid value with a glycidyl ether of a monohydric phenol, which ether is a thin to viscous liquid possessing a boiling point above 250° C. at 760 mm. pressure until the esterification is substantially complete.

8. The steps of producing ester resins which are suitable for oleoresinous varnishes and printing ink formulations, comprising the steps of heating a member of the group consisting of a di-basic aliphatic and aromatic carboxylic acid, and a natural resin of at least 75 acid value with a glycidyl ether of a monohydric phenol, which ether is a thin to viscous liquid possessing a boiling point above 250° C. at 760 mm. pressure until the esterification is substantially complete.

9. Ester resins suitable for oleoresinous varnish and printing ink formulations which are esters of natural resins of at least 75 acid value with a member of the group consisting of the monomeric monohydric phenolic ethers of aliphatic polyhydric alcohols and their epoxides.

10. Ester resins suitable for oleoresinous varnish and printing ink formulations which are esters of natural resins of at least 75 acid value and a member of the group consisting of a dibasic aliphatic carboxylic and aromatic carboxylic acid with a member of the group consisting of the momomeric monohydric phenolic ethers of aliphatic polyhydric alcohols and their epoxides.

11. Ester resins suitable for oleoresinous varnish and printing ink formulations which are esters of natural resins of at least 75 acid value with a glycidyl ether of a monohydric phenol.

12. Ester resins suitable for oleoresinous varnish and printing ink formulations which are esters of natural resins of at least 75 acid value and a member of the group consisting of a dibasic aliphatic carboxylic and aromatic carboxylic acid with a glycidyl ether of a monohydric phenol.

13. Mixed esters, suitable for oleoresinous varnishes and printing ink formulations, of rosin and unsaturated drying oil acids with a glycidyl ether of a monomeric monohydric phenol.

WILLIAM P. CODY.
EDGAR L. CLARK.

No references cited.